Figure 1:
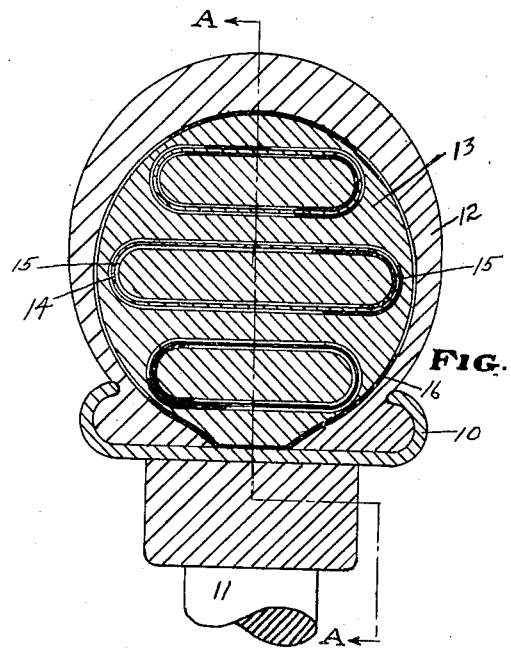

F. L. BAILEY AND J. H. LA GRANT.
CORE FOR TIRE CASINGS.
APPLICATION FILED AUG. 18, 1919.

1,339,875.

Patented May 11, 1920.

INVENTORS
Fred L. Bailey and
John H. La Grant
BY William C. Edwards Jr.
ATTORNEY.

UNITED STATES PATENT OFFICE.

FRED L. BAILEY AND JOHN H. LA GRANT, OF WICHITA, KANSAS.

CORE FOR TIRE-CASINGS.

1,339,875.     Specification of Letters Patent.     Patented May 11, 1920.

Application filed August 18, 1919. Serial No. 318,317.

*To all whom it may concern:*

Be it known that we, FRED L. BAILEY and JOHN H. LA GRANT, citizens of the United States, residing at Wichita, Sedgwick county, Kansas, have invented certain new and useful Improvements in Cores for Tire-Casings, of which the following is a description, referring to the drawings which accompany and form a part of this specification.

The invention has for its object to provide a suitable elastic core adapted to be used in lieu of the pneumatic tube now generally employed in combination with automobile tire casings and kindred uses; to eliminate a large portion of the cost of maintenance and to do away with the worry and expense occasioned by blowouts and punctures commonly experienced.

Figure 2:
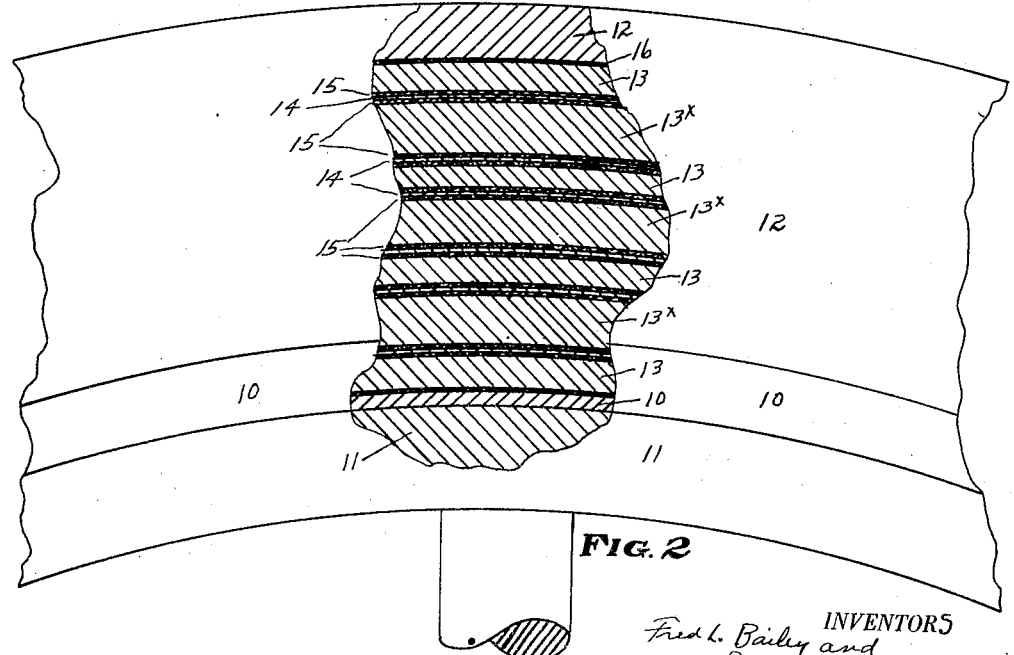

In the drawings Figure 1 illustrates a sectional view of our improved core as arranged within a tire casing carried by rim elements of an automobile wheel. Fig. 2 is a fragmentary side elevation of the wheel and tire casing disclosed in Fig. 1 with portions removed along the line A—A Fig. 1 and looking in the direction of the arrows to disclose construction features of our invention as embodied in the core arranged therein.

Similar numerals of reference indicate corresponding parts throughout the drawings.

Referring to the drawings, 10 represents a rim on an automobile wheel 11. A tire casing 12 is shown engaged within the rim 10. Circumferentially arranged within the tire casing 12 is shown an elastic unit core such as rubber 13 of sectional area equivalent to the area within said casing 12 as disclosed. A plurality of flattened sectional units or bands are transversely arranged in parallelism within said unit 13, the preferred form as seen in Fig. 1 comprehending a central band whose horizontal axis lies coincident with the horizontal axis of said unit 13 and an inner band and an outer band arranged on opposite sides of said central band.

A sectional unit is fabricated preferably of oval cross-section in which a wire coil or spring netting 14 is covered by fabric 15 and provided with an inner elastic element such as rubber $13^{x}$. In the completed core which is incased within a fabric covering 16, all the elements are vulcanized together and the transversely arranged bands of fabric covered spring metal reinforce the elastic body 13 against side spreading besides adding spring resiliency to the resiliency of the rubber elastic unit, the rubber likewise preventing collapse of the metallic spring elements.

Various sizes and shapes of core may be employed so as to readily conform to the tire casing as employed. Such modifications may be employed as lie within the scope of the appended claims.

Having fully described our invention what we now claim as new and desire to secure by Letters Patent is:

1. A core for tire casings comprising a longitudinally extending resilient unit containing a plurality of transversely disposed bands, arranged in parallelism and separated from one another by central resilient portions of said unit, each band comprising a fabric covered metallic spring element.

2. A core for tire casings comprising a longitudinally extending resilient unit having a plurality of sectional units, each oval in cross-section and arranged in parallelism within said resilient unit; each sectional unit including an inner elastic element surrounded by fabric covered metallic spring elements as specified.

3. A fabric covered core for tire casings comprising a longitudinally extending resilient unit having a plurality of flattened sectional bands arranged in parallelism within said resilient unit and separated from one another by intermediate portions of said resilient unit; each band including an inner elastic element surrounded by fabric covered metallic spring elements as specified.

FRED L. BAILEY.
JOHN H. LA GRANT.

Witnesses:
CHARLES S. THACHER,
C. A. COLE.